United States Patent
Jacobs et al.

(10) Patent No.: US 10,019,526 B2
(45) Date of Patent: Jul. 10, 2018

(54) SYSTEMS AND METHODS FOR CREATING AND USING KEYWORD NAVIGATION ON THE INTERNET

(75) Inventors: Maryanne Lottes Jacobs, Ashburn, VA (US); Keith W. Teare, Palo Alto, CA (US)

(73) Assignee: VERISIGN, INC., Reston, VA (US)

( * ) Notice: Subject to any disclaimer, the term of this patent is extended or adjusted under 35 U.S.C. 154(b) by 82 days.

(21) Appl. No.: 13/491,277

(22) Filed: Jun. 7, 2012

(65) Prior Publication Data

US 2013/0151496 A1   Jun. 13, 2013

Related U.S. Application Data

(63) Continuation of application No. 12/982,145, filed on Dec. 30, 2010, now abandoned.

(51) Int. Cl.
*G06F 17/30* (2006.01)

(52) U.S. Cl.
CPC .. *G06F 17/30873* (2013.01); *G06F 17/30864* (2013.01)

(58) Field of Classification Search
CPC .................. G06F 17/30873; G06F 17/30864
See application file for complete search history.

(56) References Cited

U.S. PATENT DOCUMENTS

| | | | |
|---|---|---|---|
| 2003/0023878 A1* | 1/2003 | Rosenberg et al. | 713/201 |
| 2003/0088562 A1* | 5/2003 | Dillon et al. | 707/5 |
| 2004/0006605 A1* | 1/2004 | McCollum et al. | 709/218 |
| 2004/0030490 A1* | 2/2004 | Hegedus | G01C 21/343 701/532 |
| 2004/0034541 A1* | 2/2004 | Caban | 705/1 |
| 2005/0055335 A1* | 3/2005 | Bae | G06F 17/30864 |
| 2005/0210149 A1* | 9/2005 | Kimball | H04L 29/12009 709/245 |
| 2008/0235383 A1* | 9/2008 | Schneider | 709/229 |
| 2009/0276285 A1* | 11/2009 | Nomula | 705/10 |
| 2009/0282023 A1* | 11/2009 | Bennett | 707/5 |
| 2009/0287684 A1* | 11/2009 | Bennett | 707/5 |
| 2011/0307484 A1* | 12/2011 | Anand | G06F 17/30887 707/736 |
| 2012/0102121 A1* | 4/2012 | Wu et al. | 709/206 |

* cited by examiner

*Primary Examiner* — Leslie Wong
(74) *Attorney, Agent, or Firm* — MH2 Technology Law Group, LLP

(57) ABSTRACT

Systems and methods are disclosed for using keywords to navigate to web pages on the Internet. In one implementation, a system includes a processor and a memory. The memory stores instructions that cause the processor to receive a search string from a website, the search string being entered by a website visitor using a browser. The processor uses a database to locate a keyword associated with the website that matches the search string. The processor determines a web page address associated with the keyword and causes the browser to be directed to the web page address. In another aspect, a method for managing keywords used for directing a browser to a web page hosted at a website, is disclosed. The method includes, among other things, storing a web page address, a keyword, and a domain name to associate the web page address, the keyword, and the domain name.

12 Claims, 13 Drawing Sheets

KeyWords Navigation

| 1 | Enter Domain | 2 | Authenticate | 3 | Manage Domains | 4 | Embed Widget |

Setup Keywords
Domain Name : ACMECORP.CC

View/Update Keywords

Save | Delete

| Keywords | Type | Associate URLS |
|---|---|---|
| cinderella | R | http://acmecorp.cc/acme/animation/Movies/kids/cinderella.html |
| 灰姑娘 | R | http://acmecorp.cc/acme/animation/Movies/kids/cinderella_ch.html |
| animated movies | L | Press the button to the right to setup location based keywords |
| Acme's fairy tales | R | http://acmecorp.cc/acme/animation/Movies/kids/cinderella.html |
| conte de fees | R | http://acmecorp.cc/acme/animation/Movies/kids/cinderella_fr.html |

Showing Page 1 of 3

Add New Keywords

+ Add | Save

ⓘ You can add multiple New Keywords

Keywords | Associate URLS

KeyWords Navigation

Home    Manage Domains    My Account    Help    Sign Out

English

| 1 | Enter Domain | 2 | Authenticate | 3 | Setup Keywords | 4 | Embed Widget |

Embed Widget           Domain Name: ACMECORP.CC

Please copy the below script into your web pages to show keyword widget in your site

[Copy]

```
<div id="web-keywords">
    <script id="kwidget" type="text/javascript" src="http://www.keywordsnavigation.com/search/js/widget.js">
    </script>
    <table width="100%" border="0" cellpadding="2" cellspacing="0">
        <tr>
            <td>
                <input type="text" name="vrsn_key" id="vrsn_key" value="Enter Keyword"
                Onkeyup="javascript:keyupInterNew(this.value, event) ;" autocomplete="off" onfocus="javascript:cleanfocus();"
                Onmouseover="this.style.textDecoration="none"" onmouseout="this.style.textDecoration='none'"
                />
                <input type="button" value="Go" name="btn" id="btn" onclick="javascript:verisign_webkeyword_search();" />
                <div id="suggest"></div>
                <div id="msgDiv"></div>
            </td>
        </tr>
    </table>
</div>
```

[Done]

Keyword Navigation

- ☑ Cinderella
- ☐ Acme
- ☑ Headphones
- ☑ Cleaner
- ☐ Books
- ☐ Movies
- ☑ Blocks
- ☐ Trains

- ⊚ Find your keyword performance here
- ⊚ Find complete, public & Internal Search Statistics
- ⊚ Keyword Suggestion helps you find what users are looking for Choose Domain: ACMECORP.CC ▷

Keywords Statistics

Domain: ACMECORP.CC

View Consolidated Keywords Statistics
Choose Time: Full ▷  HTML  PDF  WORD  EXCEL

View Keyword Statistics for the Public Keyword Search Portal
Choose Time: 30 Days ▷  HTML  PDF  WORD  EXCEL

View Keyword Widget Search Statistics
Choose Time: Full ▷  HTML  PDF  WORD  EXCEL

Keyword Site Map – Keywords Navigation – Mozilla Firefox

Save  Share                                    Choose Domain: ACMECORP.CC

```xml
<?xml version="1.0" encoding="UTF-8" ?>
<urlset xmlns="http://www.sitemaps.org/schemas/sitemap/0.9" xmlns:keywords="http://www.keywordsnavigation.com/keywords/schemas/0.9">
  <url>
    <loc>http://acmekwdemo.cc/acme/animation/Movies/kids/cinderella.html</loc>
    <keywords:keywords>cinderella,conte de fées,acme's fairy tales,灰姑娘,animated movies</keywords:keywords>
    <keywords:description />
  </url>
  <url>
    <loc>http://acmekwdemo.cc/acme/products/audio/headphones/ES400.html</loc>
    <keywords:keywords>headphones,ES400,noise cancelling,耳機 </keywords:keywords>
    <keywords:description />
  </url>
  <url>
    <loc>http://acmekwdemo.cc/acme/products/audio/speakers/S9050.html</loc>
    <keywords:keywords>speakers,S9050,audio,surround sound</keywords:keywords>
    <keywords:description />
  </url>
```

FIG. 9

SYSTEMS AND METHODS FOR CREATING AND USING KEYWORD NAVIGATION ON THE INTERNET

This is a continuation of application Ser. No. 12/982,145, filed Dec. 30, 2010.

FIELD

This disclosure is generally directed to systems and methods for directing Internet traffic and, more particularly, to systems and methods for creating and using domain specific keywords that direct website visitors to a specified web page.

BACKGROUND

A website has become a common and necessary part of doing business. Businesses and other organizations rely on their websites to offer information on current products, to preview forthcoming products, to generate interest in products, to sell their products, etc. For businesses with many products and/or services, the amount of information on the website and the number of individual web pages can be substantial.

Because of the amount of information on a website, customers may find it difficult or bothersome to find a specific piece of information. For example, the information they seek may be buried under several menus or links. As a solution, many websites offer a "search" function for the website. The search function looks for search terms on each page of the website and returns a search result containing pages responsive to the search terms. Such searches are often offered by search engines from third parties such as Google®, Bing®, and Yahoo!®, but may also be offered by a custom search function. Unfortunately, customers can find wading through the search results cumbersome, time consuming, and frustrating. For example, the information the customer seeks may be located near the end of a long result list and the customer may give up before reaching it.

Therefore, it is desirable to introduce tools to allow website domain owners to direct website visitors to pages the domain owner deems important without having to reorganize or republish the website web pages. It is also desirable to introduce a tool that helps domain owners track the information website visitors search for most often and to automatically create a website map that emphasizes the pages the domain owner values.

SUMMARY

Marketing personnel often link a marketing campaign to the business' website. This can be done with the use of a page set up specifically for the campaign. For example, Acme Corporation may have a marketing campaign directed toward its headphones, and include a direction for customers to go to www.acmecorp.cc/headphones for more information. However, customers may not remember this exact URL at the time they reach their computer. Instead, a customer may search for 'headphones' from the home page of www.acmecorp.cc, resulting in a search list that may or may not lead the customer to the location created by the marketing personnel. In other words, the customer may choose a link other than the link that marketing would like the customer to choose.

Disclosed embodiments provide systems and methods that help domain name controllers establish, maintain, and control keywords that can be used to direct website traffic. Disclosed embodiments may also allow domain name controllers to track usage of keywords and other search terms entered via website searches and to quickly create a website map highlighting web pages deemed significant by the domain name controller.

Consistent with disclosed embodiments, a method is provided for directing a browser to a web page hosted at a website. The method may include receiving a search string from the website, the search string entered by a website visitor using the browser and using a database to locate a keyword associated with the website that matches the search string. The method may further include determining a web page address associated with the keyword; and causing the browser to be directed to the web page address. In some aspects, the method may further include causing the search string to be passed to a search function when a keyword matching the search string cannot be located in the database.

Consistent with other disclosed embodiments, a system for managing keywords for a web page hosted at a website is provided. The system may include a processor; and a memory coupled to the processor. The memory may store instructions that direct the processor to perform operations. The operations may include receiving a domain name for the website from a user, receiving a keyword for the domain name from the user, and receiving a web page address corresponding to the keyword from the user. The operations may further include storing the keyword, the web page address, and the domain name in a database to associate the web page address, the keyword, and the domain name.

Consistent with other disclosed embodiments, a method is provided for directing a browser to a web page hosted at a website. The method may include receiving a request that includes a predetermined hostname from a user via the browser. The method may further include parsing the request to locate a domain name and a search string and using a database to locate a keyword associated with the domain name and matching the search string. The method may further include determining a web page address associated with the keyword and causing the browser to be directed to the web page address.

Consistent with yet other disclosed embodiments, a system is provided for locating a website. In certain aspects, the system includes a processor; and a memory coupled to the processor. The memory may store instructions to direct the processor to perform operations. The operations may include receiving a search string entered by a user and using a database to locate a keyword matching the search string. The operations may further include determining a domain name associated with the matching keyword, determining a web page address associated with the matching keyword, and retrieving a description for the web page address associated with the matching keyword. The operations may further include generating data used to display the domain name, the web page address, the description, and the matching keyword to the user, wherein the description is displayed as a hyperlink that causes a browser to be directed to a web page associated with the web page address.

Consistent with other disclosed embodiments, computer-readable storage devices may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 is an exemplary interface for a domain name controller to create and maintain keywords for a domain, consistent with disclosed embodiments;

FIG. 6 is an exemplary interface for receiving a keyword navigation widget, consistent with disclosed embodiments;

FIG. 8 is an exemplary interface for viewing statistics about keyword navigation, consistent with disclosed embodiments;

FIG. 9 is an exemplary website map created from a keyword database, consistent with disclosed embodiments;

DESCRIPTION OF THE EMBODIMENTS

Figure 1:
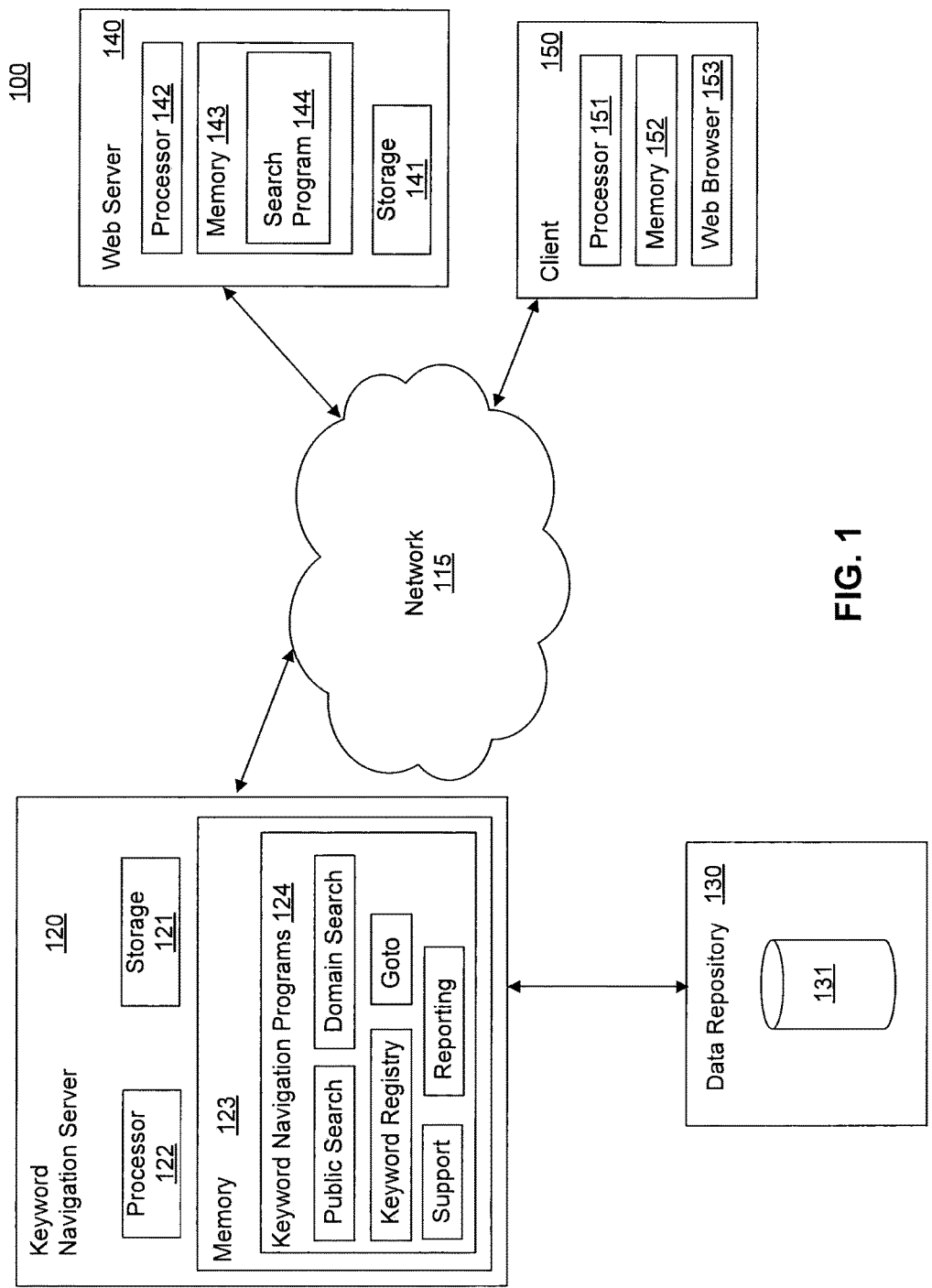
FIG. 1 is a diagram illustrating an exemplary keyword navigation system that may be used to implement disclosed embodiments.

Disclosed embodiments provide a domain name focused keyword system and methods of using the keyword system. Such a system allows non-technical personnel in an organization to effectively direct website users to a specific web page located within the organization's website. The system offers an alternative way to resolve Internet addresses and may be part of a larger system for resolving Internet address that includes, for example, Audio URL resolution and QR code resolution. Each website may have a domain name that is owned and operated by an organization or an individual. A domain name is a human-recognizable name given to a set of resources available on the Internet. Domain names are acquired from Registrars accredited by the Internet Corporation for Assigned Names and Numbers. A domain name registration indicates that the organization or individual has the legal right to control the Internet resources associated with the domain name. These resources may include web pages. Each web page within a website or domain has a unique address known as a Uniform Resource Locator ("URL"). A URL typically begins with the domain name followed by additional information that identifies the location of the web page within the website or domain. For example, in the URL www.acmecorp.cc/headphones, the domain name is acmecorp.cc and the additional information "/headphones" identifies the location of the web page within www.acmecorp.cc. An Internet browser directed to a URL uses the URL to find and display information contained on the web page associated with the URL.

Disclosed embodiments provide a keyword navigation system that allows a domain name controller or operator to associate keywords with a URL hosted on a domain. Keywords may include single words or multi-word phrases comprised of characters compatible with UTF-8 character encoding, including accented characters, spaces, foreign characters (such as Greek, Arabic, Kanji, and Han characters), punctuation marks, etc. Because keywords may be compatible with UTF-8 character encoding, a keyword phrase may include words from more than one language. Once a user establishes keywords for a domain, a keyword navigation system intercepts searches performed by a website visitor and attempts to match the search terms to a keyword for the domain. If a match is found, then the keyword navigation system redirects the website visitor's browser to the URL associated with the keyword. If no match is found, the search terms are directed to a search function and the website visitor's browser displays a search result list for the search terms. In some embodiments, the domain name controller may also establish a predetermined hostname that redirects an Internet resource request to the keyword navigation system. A hostname is a label given to a resource, such as a server, connected to a network, such as the Internet.

Reference will now be made in detail to exemplary embodiments, examples of which are illustrated in the accompanying drawings. Wherever convenient, the same reference numbers will be used throughout the drawings to refer to the same or like parts.

FIG. 1 is a diagram illustrating an exemplary keyword navigation system 100 that may be used to implement disclosed embodiments, including exemplary system components. The components and arrangement, however, may be varied. Keyword navigation server 120 may include a processor 122, a memory 123, input/output (I/O) devices (not shown), and storage 121. Keyword navigation server 120 may be implemented in various ways. For example, keyword navigation server 120 may be a general purpose computer, a server, a mainframe computer, or any combination of these components. Keyword navigation server 120 may communicate over a link with network 115. For example, the link may be a direct communication link, a LAN, a WAN, or other suitable connection. Network 115 may include the Internet. Keyword navigation server 120 may be standalone or it may be part of a subsystem, which may, in turn, be part of a larger system, such as a legacy domain registration system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more keyword navigation programs or subprograms 124 loaded from storage 121 or elsewhere that, when executed by keyword navigation server 120, perform various procedures, operations, or processes consistent with disclosed embodiments. For example, memory 123 may include a keyword registry program that authenticates a domain name, provides a keyword widget, and allows a domain name controller to set up and maintain keywords for the domain name; a domain search program that intercepts a website visitor's search of a website, matches the search terms to a keyword for the domain name, and redirects the website visitor to a URL associated with the keyword; a reporting program that displays statistics about keyword usage and other search terms; a public search program that searches a database of domain name focused keywords; a goto program that enables an Internet user to go directly to a URL associated with a keyword by using a predetermined hostname alias for the domain name; and an integrative support program that links the other programs and allows them to use a common database, provides a common user interface, performs basic bookkeeping tasks, (such as storing the user's input, etc.), and provides user guidance and help. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a keyword navigation program 124 that performs several functions when executed by processor 122. For example, memory 123 may include a single program 124 that performs the functions of the keyword navigation system, or program 124 could comprise multiple programs. Moreover, processor 122 may execute one or more programs located remotely from keyword navigation server 120. For example, keyword navigation server 120 may access one or more remote programs that, when executed, perform functions related to disclosed embodiments.

Memory 123 may be also configured with an operating system (not shown) that performs several functions well known in the art when executed by keyword navigation server 120. By way of example, the operating system may be Microsoft Windows™, Unix™, Linux™, Solaris™, an Apple Computers operating system, Personal Digital Assistant operating system such as Microsoft CE™, or some other operating system. The choice of operating system, and even to the use of an operating system, is not critical to any embodiment.

Keyword navigation server 120 may include one or more I/O devices (not shown) that allow data to be received and/or transmitted by keyword navigation server 120. I/O devices may also include one or more digital and/or analog communication input/output devices that allow keyword navigation server 120 to communicate with other machines and devices, such as web server 140 or client computer 150. Keyword navigation server 120 may receive data from external machines and devices and output data to external machines and devices via I/O devices. The configuration and number of input and/or output devices incorporated in I/O devices may vary as appropriate for certain embodiments.

Keyword navigation server 120 may also be communicatively connected to one or more data repositories 130, e.g., through network 115. Data repository 130 may include one or more files or databases 131 that store information and are accessed and/or managed through keyword navigation server 120. By way of example, the databases may be Oracle™ databases, Sybase™ databases, or other relational databases, or non-relational databases, such as HBase or Cassandra. The databases or other files may include, for example, data and information related to domain names, keywords for domain names, descriptions, statistics, and other data related to keywords, etc. Systems and methods of disclosed embodiments, however, are not limited to separate databases.

Keyword navigation server 120 may be communicatively connected to one or more web servers 140 through network 115. In some embodiments, web server 140 may be owned or operated by a domain name controller and may store web pages and other Internet resources associated with the domain name. Web server 140 may include a processor 142, a storage 141, and a memory 143. Storage 141 may be a volatile or non-volatile, magnetic, semiconductor, tape, optical, removable, nonremovable, or other type of storage device or computer-readable medium and may contain data used to display individual web pages. In disclosed embodiments, memory 143 may include one or more search programs or subprograms 144 loaded from storage 141 or elsewhere that, when executed by web server 140, allow keyword navigation server 120 to interact with web server 140 to, for example, intercept a search of web pages on the domain name.

Keyword navigation server 120 may also be communicatively connected to one or more client computers 150 through network 115. Client computer 150 may include a processor 151, a memory 152, and a web browser 153 to communicate with keyword navigation server 120 and/or web server 140. Client computer 150 may also be communicatively connected to web server 140 through Network 115. Keyword navigation server 120 may send data to processor 151 and web browser 153, and web browser 153 may display the data as a keyword registration interface. In some embodiments, keyword navigation server 120 may render a keyword registration interface and send the interface to web browser 153 for display. In other embodiments, keyword navigation server 120 may send the data used to create the interface to client computer 150 and client computer 150 may render the keyword navigation interface.

Client computer 150 may send data to keyword navigation server 120 indicating selection of a keyword, URL, other data related to a keyword, etc. Client computer 150 may also send authentication requests and public search requests to keyword navigation server 120. Client computer 150 may include I/O devices (not shown) to enable communication with a user. For example, the I/O devices may include one or more input devices, such as a keyboard, touch screen, mouse, and the like, that enable client computer 150 to receive data from a user, such as search requests, keywords, web addresses (URLs), etc. Further, client computer 150 may include I/O devices that communicate with one or more output devices, such as a display screen, CRT monitor, LCD monitor, plasma display, printer, speaker devices, and the like, that enable client computer 150 to present data to a user.

Figure 2:
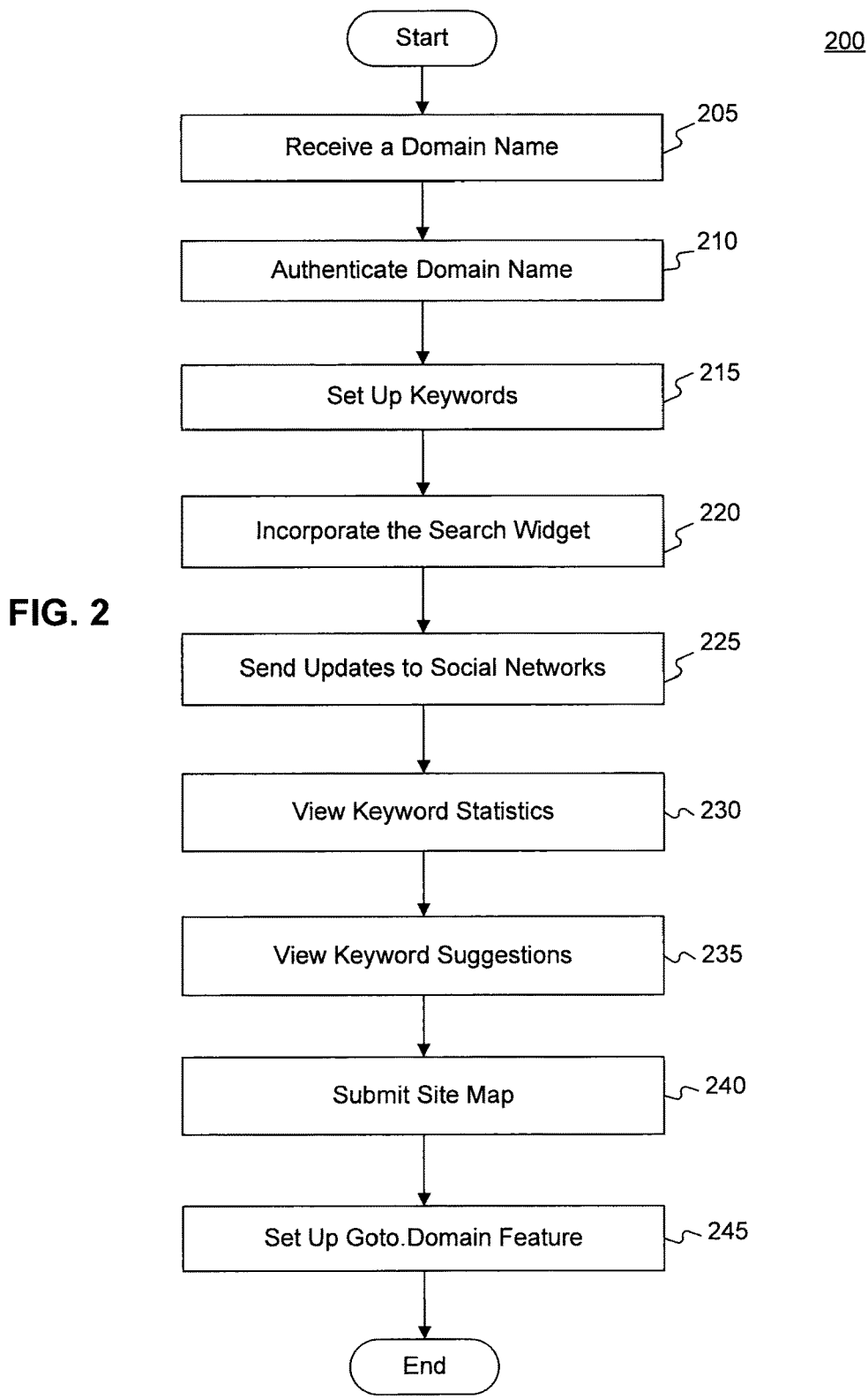
FIG. 2 is a flow diagram illustrating exemplary processes performed by a keyword navigation system, consistent with disclosed embodiments.

FIG. 2 is flow diagram illustrating exemplary processes performed using a keyword navigation server, consistent with disclosed embodiments. This process is a high level view of how a domain name controller may interact with keyword navigation server 120. In certain embodiments, process 200 may be implemented according to keyword navigation programs 124. In some embodiments, keyword navigation server 120 may be associated with a domain name registration service, but keyword navigation server 120 need not be associated with such a service.

In Step 205 of FIG. 2, keyword navigation server 120 may receive a domain name from a user. After receiving a domain name, keyword navigation server 120 may store each domain name received from the user in an account associated with the user. In certain embodiments the user may set up an account on keyword navigation server 120 before providing the domain name. If the user does not have an account, the user may be prompted to create one before proceeding. Once a user has an account, the user may provide one or more domain names to keyword navigation server 120. A domain name identifies a realm of authority or control of Internet resources. Domain names are often hostnames that identify websites. For example, acmecorp.cc may be a domain name used by the Acme Corporation. Domain names are registered through domain name Registrars to signify an exclusive right to use the Internet resources associated with the domain name.

In Step 210 of FIG. 2, keyword navigation server 120 may initiate a process to authenticate a domain name received from the user. Because keyword navigation server 120 makes it possible to redirect Internet traffic from a particular domain name, keyword navigation server 120 may in some embodiments require a user to verify that the user owns the domain name before allowing the user to set up keywords for the domain name. For example, keyword navigation server 120 may create a meta tag for the user to insert into the home page of the domain. Such a meta tag may look like "<meta name="keyword-verification" content="djkaoieiosldisa"/>." Keyword navigation server 120 may store the domain name and the value of the content field in a database, such as database 131 or other file. After the meta tag has been inserted into the home page, the user may return to the authentication process of keyword navigation server 120. Keyword navigation server 120 may then query the home page of the domain and look for the meta tag. If the meta tag exists and has a content value matching the value stored by keyword navigation server 120, then the user is verified as having control over the domain name.

In alternate embodiments, a user may be requested to set up a CNAME record in the domain name system (DNS). A DNS record stores information used to resolve Internet address requests into a physical resource. A CNAME record specifies that a domain name is an alias of another domain. Keyword navigation server 120 may, for example, instruct the domain name controller to add a CNAME Host of "djkaoieiosldisa" and a CNAME Text of "www.keyword-navigation.com" to the DNS. Keyword navigation server 120 may store the CNAME Host with the domain name at a local database. After the CNAME record has been set up, the user may return to the authentication process of keyword navigation server 120. Keyword navigation server 120 may then query the DNS of the domain to look for the CNAME Host and, if it is found and matches the stored CNAME Host, the user is verified as the owner of the domain name.

Regardless of the method used to authenticate a domain name, keyword navigation server 120 may store a flag with the domain name to indicate that it has been authenticated. This allows keyword navigation server 120 to distinguish between domains that have been authenticated and those that have not.

For authenticated domain names, in Step 215, keyword navigation server 120 may allow a domain name controller to provide keywords for the domain. As described above, keywords may be one or multi-word phrases that are likely to be entered by a website visitor when searching for information. The keywords are not limited to English characters, but can be any character supported by UTF-8 character encoding.

Keyword navigation server 120 may provide an interface, such as the interface shown in FIG. 3, that allows a domain name controller to set up keywords. Keywords are associated with a domain name and keyword navigation server 120 may display the current domain name 305 in the interface. As shown in FIG. 3, keyword navigation server 120 may receive at least keyword 310 and URL 315 from the domain name controller, forming a keyword-URL pair. The URL identifies a specific web page that the domain name controller desires the website visitor to see when the website visitor searches the domain with search terms that match the keyword. The URL may be a web page hosted at domain 305, but it need not be. The URL may be the address of any web page of any domain that the domain name controller chooses. After receiving the keyword and URL, keyword navigation server 120 may store the keyword-URL pair in a database or other file. The keyword-URL pair is associated with the current domain name 305.

In addition to this information, keyword navigation server 120 may also gather additional information, or metadata, related to a keyword through, for example, icon 320. This additional information may include, but is not limited to, a description of the URL or a description of the keyword. A URL description may be a business description of the URL that the domain name controller chooses. This description may be displayed as part of a public search or used in an advanced public search, as described with regard to FIGS. 12 and 13. The description may also be used on keyword statistic reports and other reports generated by keyword navigation server 120. A URL description or a keyword description may be used in updates to social media websites, as described below with regard to Step 225 of FIG. 2.

A keyword-URL pair may also be mapped to a location. A location may specify a zip code, a state, an area code, a country, a geo-location code, or some other geographic identifier. A domain name user may desire to have a different web page display for website visitors located in Hawaii than for website visitors located in Minnesota. Keyword navigation server 120 may receive a geo-location code from a device supporting GPS or may use a source IP address of the website visitor to determine the location of the website visitor. Keyword navigation server 120 may use this information to select a keyword-URL pair. The location allows a domain name controller to run regional advertising campaigns and direct website visitors to the appropriate regional offers.

A keyword may also have associated device metadata. The device may represent, for example, a personal digital assistant (PDA), a smart phone, a laptop, a tablet, etc. The device may enable keyword navigation server 120 to redirect a website visitor to the web page appropriate for the device type. For example, a domain may have one web page for mobile devices, such as a PDA or smart phone, and another web page for all other devices. Keyword navigation server 120 may be configured to determine the type of device that initiated the search request and use the device type to choose an appropriate keyword-URL pair.

Keyword navigation server 120 may use keyword type 325 of FIG. 3 to identify keywords with locations or devices. For example, a keyword with a type of "R" may not have any associated locations or devices. A keyword with a type of "L" may have locations associated with the keyword and a keyword with a type of "D" may have devices associated with the keyword. Keyword navigation server 120 may assist a domain name controller in setting up locations for a keyword using an interface, such as interface 400 shown in FIG. 4. Keyword navigation server 120 may display interface 400, for example, when the domain name controller selects icon 330, shown on FIG. 3.

Figure 4:
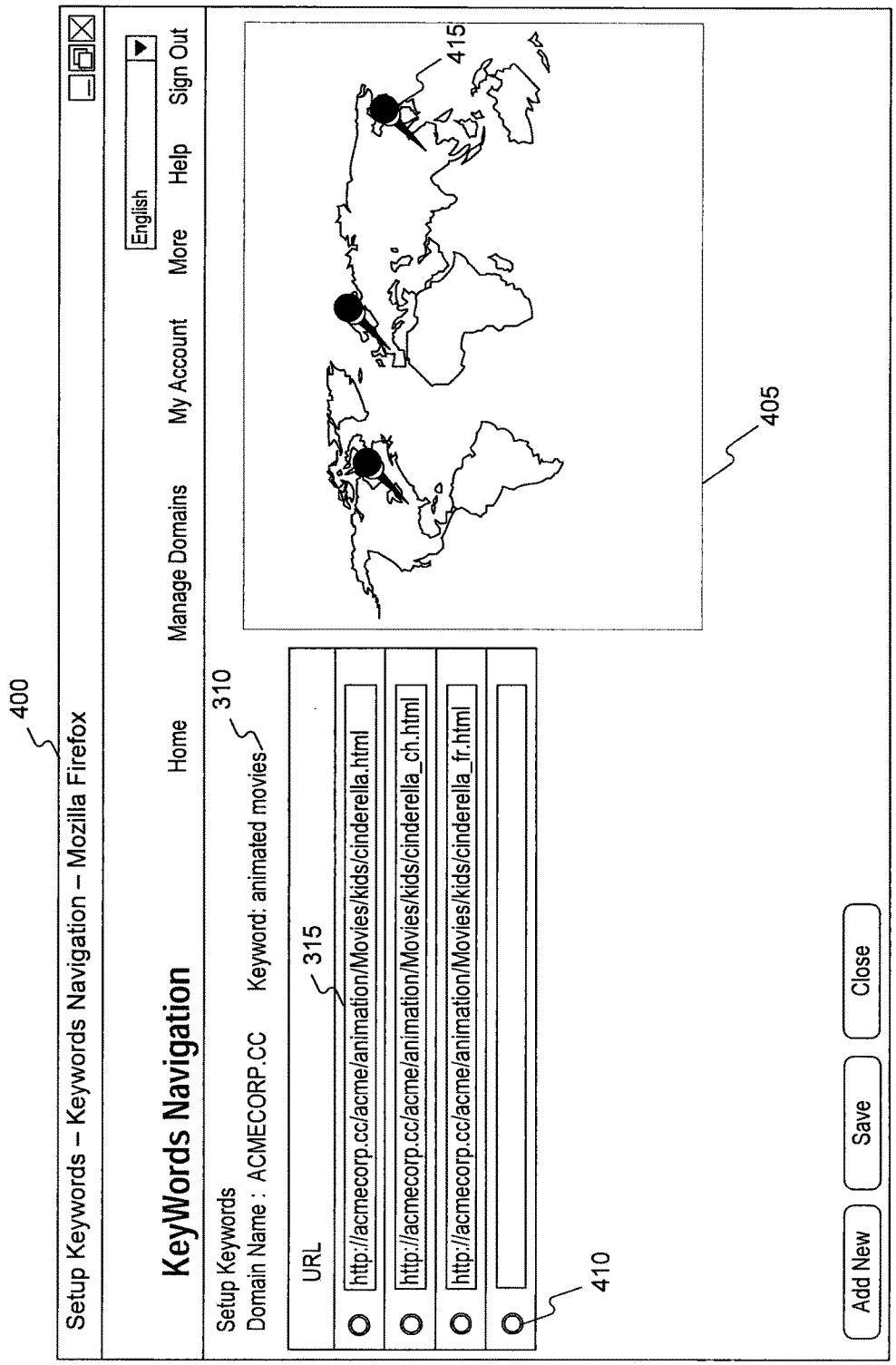
FIG. 4 is an exemplary interface for creating and maintaining location based keyword-URL pairs, consistent with disclosed embodiments.

Through interface 400, keyword navigation server 120 may enable a domain name controller to map a URL-keyword pair to a location. As shown in FIG. 4, a domain name controller may select a location for each URL associated with the current keyword 310. When a domain name controller enters a new URL, keyword navigation server 120 may prompt the domain name controller for a location. For example, keyword navigation server 120 may prompt the domain name controller to select a location on map 405 to associate with the keyword-URL pair. Map 405 may show the locations of already-mapped URL-keyword pairs through the use of markers 415. When keyword navigation server 120 receives a selection of a URL through, for example, one of buttons 410, map 405 may scroll to show the location associated with the selected URL. For example, if domain name controller selects the URL "http://acmecorp.cc/acme/animation/Movies/kids/cinderella_ch.html," keyword navigation server 120 may cause map 405 to scroll so that the marker 415 pointing to China becomes centered in the map. As described above, a domain name controller may place a new marker on map 405 when entering a new URL. Disclosed embodiments are not limited to the interface of FIG. 4 for mapping a URL-keyword pair to locations. Other methods may be used to map a location to a URL-keyword pair, such as text entry or a drop down list. Similar methods may be used to associate device types with a URL-keyword pair.

Returning to the example of FIG. 3, an Acme Corporation representative has authenticated "acmecorp.cc" and has set up keywords to market a recently created animated version of the fairy tale Cinderella. In addition to the English keywords "cinderella" and "Acme's fairy tales," which are associated with the same URL, and the English keyword "animated movies," which is associated with various URLs depending on the location of the website visitor (as discussed with regard to FIG. 4 above), the Acme representative has also set up a Chinese keyword, "灰姑娘," which is associated with a Chinese version of the web page, and a French keyword, "conte de fées," which is associated with a French version of the web page. As can be seen from FIG. 3, a particular URL may correspond to many associated keywords.

Figure 5:
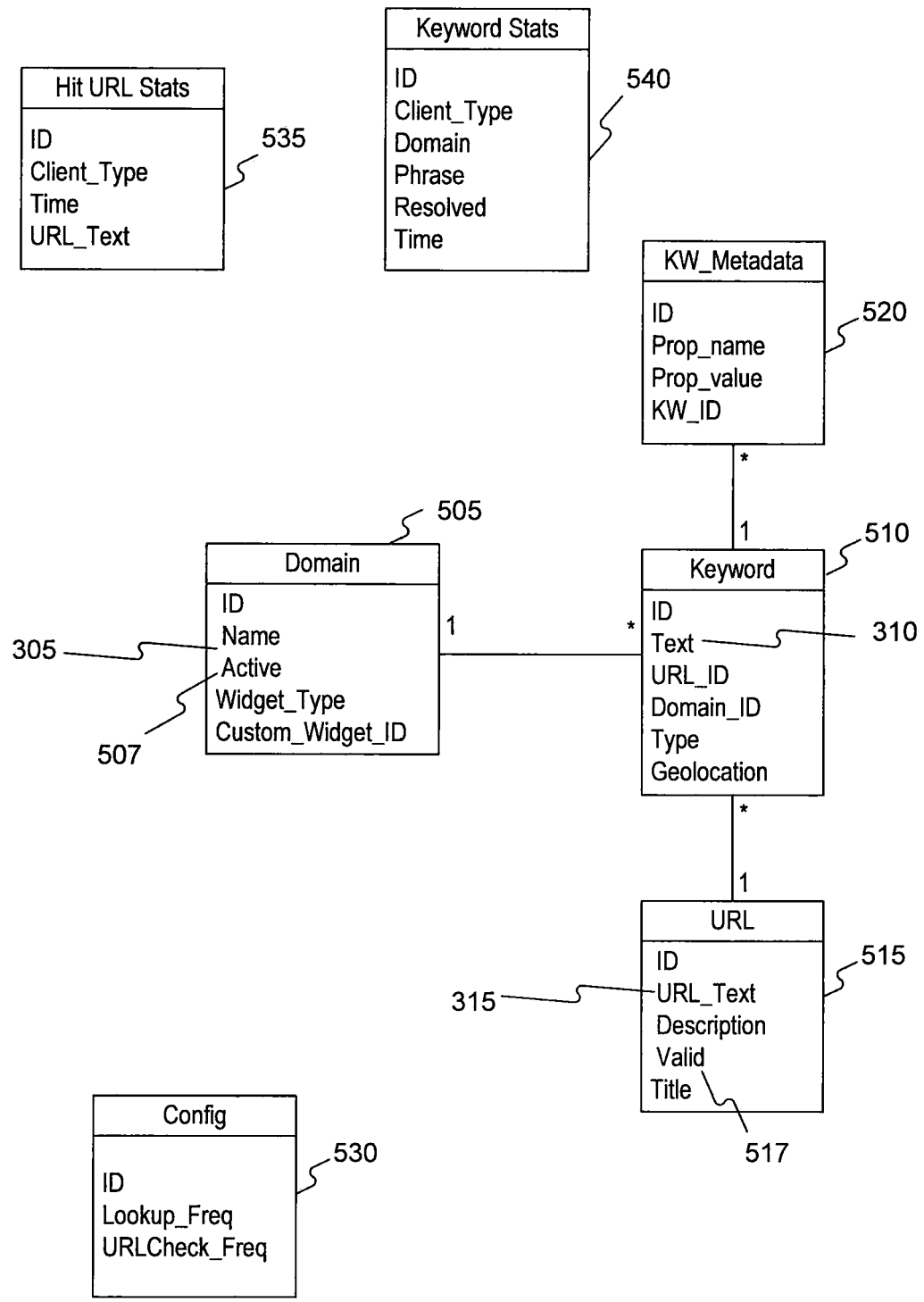
FIG. 5 is a diagram illustrating an exemplary data dictionary storing data for keyword navigation, consistent with disclosed embodiments.

FIG. 5 is a diagram illustrating an exemplary data dictionary storing data for keyword navigation, consistent with disclosed embodiments. Domain names entered by domain name controllers, and displayed as domain name 305 in FIG. 3, may be stored in domain table 505. Domain table 505 may include a flag, such as flag 507, that indicates that the domain is active and authenticated. In certain embodiments, the domain name controller may choose to update flag 507 to "inactive" so that keyword navigation is turned off for the domain and keywords are not resolved to a URL even if a keyword exists for a search term. Domain table 505 may also include a widget type and a custom widget id to assist in passing the search terms to an appropriate search function when a keyword does not exist for the search terms entered.

Keywords 310 of FIG. 3 may be stored in keyword table 510. As shown in FIG. 5, keyword 310 may be associated with a URL and a domain. In addition, keywords may have one or more associated properties, or metadata, as shown by table 520. The properties may include longer descriptions or the expiration date of a keyword, etc. Table 520 may also include pricing properties for a keyword, such as a yearly or monthly cost of the keyword, or a group the keyword belongs to for pricing purposes. In some embodiments the metadata may also include locations or device types associated with a keyword. In other embodiments, the keyword type or keyword location may be included in keyword table 510, as shown in FIG. 5.

Table 515 may store URL 315 of FIG. 3 and other associated information, such as a description of the URL as well as a flag 517 indicating whether the URL is still valid. For example, keyword navigation server 120 may periodically verify that the URL address still exists and has not been moved or removed by the domain name controller. If keyword navigation server 120 finds that the page is no longer valid, keyword navigation server 120 may update flag 517 accordingly to "invalid" so that keywords do not direct website visitors to an invalid page.

One skilled in the art will recognize that table 530 may store other information used by keyword navigation server 120, such as the frequency that each URL is checked for validity and the frequency that each domain name is checked for authenticity.

Disclosed embodiments may also include statistics tables 535 and 540. Hit URL Stats table 535 may track the number of times a URL is selected from a public portal search, a hostname redirect, or a website search redirect. Table 535 may also track the date and time of the selection as well as the type of selection, such as a public portal search or a hostname resolution. Table 540 may track the search terms entered by a website visitor, whether the search terms resolve to a keyword, the time of the search, and the type of search, such as a search from a public portal, a hostname resolution, or a search of a domain name.

Returning to FIG. 2, in Step 220, keyword navigation server 120 may provide a keyword widget to the domain name controller. The keyword widget may include computer-executable instructions that allow keyword navigation server 120 to intercept a search of a website. The domain name controller may add widget code to a search script used to search the web pages associated with the domain name. For example, the owner of the domain acmecorp.cc may have a search box on the home page that allows website visitors to www.acmecorp.cc to search all web pages associated with acmecorp.cc. The search box may invoke a third party search function or a custom search function. The widget may be software code that the domain name controller inserts into the script that runs when the website visitor uses the search box at www.acmecorp.cc, creating an upgraded site search box.

FIG. 6 is an example of an interface of keyword navigation server 120 that provides a keyword navigation widget to a domain name controller. The interface may provide widget code 605 in a manner that makes the code easy for the domain name controller to copy. Disclosed embodiments may provide different versions of widget code, for example, depending on the search function used by the domain name controller. In such embodiments, keyword navigation server 120 may provide an interface that allows the domain name controller to choose the appropriate version of the widget. For example, keyword navigation server 120 may offer one widget for searches using the Google® search engine, another for searches using the Bing® search engine, and a third for a custom search function. The widget code 605 may allow keyword navigation server 120 to interact with the domain server, such as web server 140, to intercept searches of the domain. Once the widget is installed, keyword navigation server 120 may intercept searches of domain resources and cause website visitors to navigate to a URL associated with a keyword matching search terms entered by the user.

Figure 7:
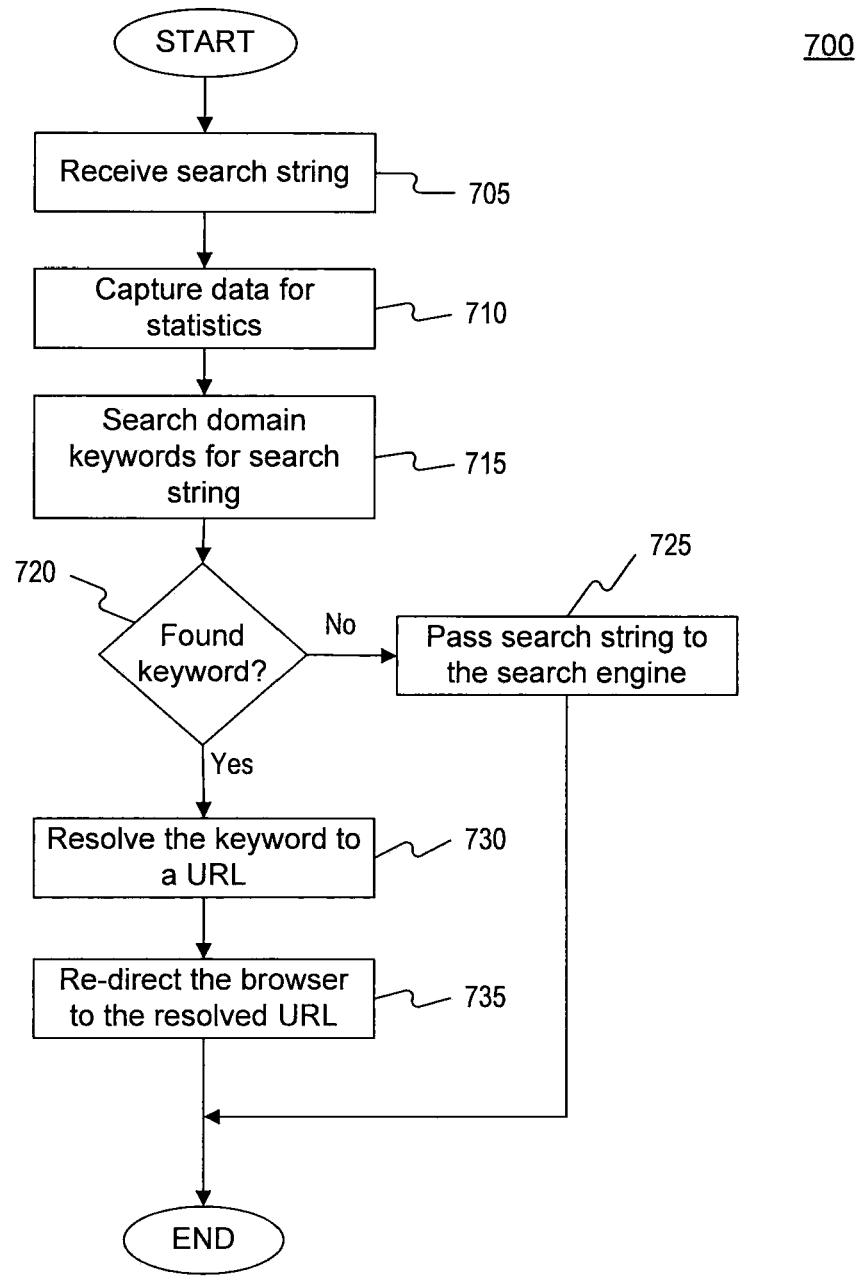
FIG. 7 is a flow diagram illustrating an exemplary process for using keywords to navigate to a web page, consistent with disclosed embodiments.

FIG. 7 is a flow diagram illustrating an exemplary process 700 for using keywords to navigate to a web page, consistent with disclosed embodiments. Keyword navigation server 120 may execute process 700, for example, when a website visitor uses an upgraded site search box, such as a search box at a website where the website owner has set up keywords and has installed keyword widget 605.

At Step 705, keyword navigation server 120 may receive a search string entered by a website visitor. The website visitor may enter the search string in an upgraded site search box that is part of a web page hosted at the domain, such as a web page hosted on web server 140. The keyword widget 605 may allow keyword navigation server 120 to detect when the website visitor enters text into the upgraded site search box. In some embodiments, keyword navigation server 120 may communicate with web server 140 while the website visitor is typing into the upgraded site search box, such that keyword navigation server 120 searches for keywords that match what the website visitor has typed so far and offers the matching keywords as suggestions. In other embodiments, keyword navigation server 120 may take no action until the website visitor finishes entering the search string and clicks on a "search" button, or otherwise indicates that the search should begin.

Once keyword navigation server 120 receives a search term entered by the website visitor, keyword navigation server 120 may capture statistical data on the search term entered for later statistical reports at Step 710. In certain embodiments, keyword navigation server 120 may capture the domain name of the search and the search string entered by the website visitor. In other embodiments, keyword navigation server 120 may capture additional data, such as the location of the website visitor, the device type used by the website visitor, the date of the search, etc. Keyword navigation server 120 may capture data on search strings regardless of whether any keywords for the domain match the search string. The data may be stored, for example, in table 540. Data on search strings that do not match any keywords for the domain may be used by keyword navigation server 120 to suggest additional keywords to the domain name controller. For example, keyword navigation server 120 may suggest popular search strings as additional keywords, because these search strings represent products or services that many website visitors desire information on. Keyword navigation server 120 may identify popular search strings by tracking the number of times the search string is entered by website visitors.

At Step 715, keyword navigation server 120 may search the keyword database, such as table 510, for a keyword that matches the search string. In certain embodiments duplicate keywords are not allowed within a domain name. In other embodiments, duplicate keywords are only allowed within a domain name when the duplicates have different locations. In yet other embodiments, duplicate keywords are allowed within a domain name when the duplicates have different device types. Therefore, keyword navigation server 120 may find a single keyword that matches the search terms even if location or device type must be used to select the single keyword.

If no matching keyword is found for the domain name (Step 720, No), then, in Step 725, keyword navigation server 120 may pass the search string to the search function chosen by the domain name controller for searches performed on the domain name controller's website. Such search functions may include those offered by third party search engines or custom search processes. The search function handles the search string as usual and returns search results to the website visitor without further interaction from keyword navigation server 120.

If a matching keyword is found for the domain name (Step 720, Yes), then, in Step 730, keyword navigation server 120 may resolve the keyword to a URL associated with the keyword using, for example, table 515. In certain embodiments, keyword navigation server 120 may check flag 517 to verify that the URL is still valid. If the URL is not valid, keyword navigation server 120 may determine that a resolution cannot be made and transfer control to Step 725, described above. In other embodiments, keyword navigation server 120 may check flag 507 before resolving a URL. If flag 507 indicates that the domain name is no longer authenticated, keyword navigation server 120 may transfer control to Step 725, described above.

In some embodiments, keyword navigation server 120 may check the keyword type to determine if location information or device information is needed to resolve the keyword to a URL. If location information is needed, keyword navigation server 120 may determine the location of the website visitor and use this information to resolve the keyword to a URL. In some embodiments, where the website visitor is using a mobile device or a computer supporting global positioning systems (GPS) geo-location, keyword navigation server 120 may receive a geo-location code from the device or computer. Keyword navigation server 120 may use the geo-location code to determine the location of the website visitor. In other embodiments, keyword navigation server 120 may use the IP address of the device the visitor is using to determine the location of the website visitor. Finally, in Step 735, keyword navigation server 120 may re-direct the browser of the website visitor to the resolved URL.

Returning to FIG. 2, in Step 225, keyword navigation server 120 may facilitate updates to social media websites such as Facebook®, MySpace®, and Twitter®, after new keywords are added by a domain name user. For example, keyword navigation server 120 may allow a domain name user to connect the keyword navigation account with a Facebook® account. Once connected to a Facebook® account, keyword navigation server 120 may enable a domain name user to initiate a broadcast on the Facebook® website using, for example, a business description associated with the keyword or URL. In this manner, the domain name controller can advertise a promotion associated with the keyword at the same time as setting up a keyword.

In Step 230, keyword navigation server 120 may create keyword statistic information for the domain name controller to view. As described above with regard to Step 710 of process 700, keyword navigation server 120 may gather data on the search strings entered by website visitors, the number of times particular search strings have been used, and a date, location, or portal associated with each use. Statistics may also be gathered through a hostname resolution, as described below with regard to FIG. 10, or a public search portal, as described below with regard to FIG. 11. Such statistics may be stored in, for example, tables 535 and 540. Keyword navigation server 120 may use this information to produce various reports for the domain name controller.

Display 800 of FIG. 8 is an exemplary interface used by keyword navigation server 120 to allow a domain name controller or other user to request statistics for keywords and other search terms used at the domain. Keyword navigation server 120 may receive parameters from a domain name controller using an interface such as interface 800. For example, keyword navigation server 120 may receive the type of statistics desired, such as consolidated keyword statistics, statistics for the public keyword search portal, statistics for non-keyword search terms, or widget search statistics, the time frame for the statistics, and the format of the report through interface 800.

In Step 235, keyword navigation server 120 may create keyword suggestions for the domain name controller. In some embodiments, keyword navigation server 120 may use information from table 540 to determine phrases that were searched on the domain name controller's website but not resolved to a keyword. Keyword navigation server 120 may suggest such frequently searched terms as keywords. In other embodiments, keyword navigation server 120 may crawl and analyze the domain of the domain controller to find frequently used words or phrases and propose keywords based on this information gathered during the crawl. In yet other embodiments, keyword navigation server 120 may crawl an analyze websites similar in type and/or content to the domain of the domain controller and suggest keywords as a result of the information gathered during this crawl. In still other embodiments keyword navigation server 120 may search third party APIs, such as social networking APIs, and other dynamic content streams, such as RSS feeds, to filter out popular terms that may be of potential interest to the domain name controller. For example, if a new book has just been published, the title and author of the book may be of interest to a domain that sells or reviews books. Keyword navigation server 120 may suggest the title of the book, the author of the book, or both to the domain name controller as keywords.

In Step 240, keyword navigation server 120 may generate data used to submit a website map. A website map may be an XML file that third party search engines, such as Google®, Yahoo!®, Bing®, and Ask®, receive from domain name controllers to help the search engine bots find pages on the website. Keyword navigation server 120 may enable a domain name controller to create a website map from the URL-keyword pairs that the domain name controller has created, for example, using interface 300 of FIG. 3. Such a website map may contain the web pages the domain name controller considers important and highlight the web pages with keywords chosen by the domain name controller. FIG. 9 is an exemplary interface for creating and sharing such a website map. When keyword navigation server 120 receives a request to create a website map, keyword navigation server 120 may gather the keywords and related URLs for the selected domain name. Keyword navigation server 120 may then format the data into an XML file format, as shown in FIG. 9. The XML data may then be saved to a file, shared with a search engine, etc.

In some embodiments, keyword navigation server 120 may generate data used to display a visual navigation website map. Such a visual website map may display keywords with frequent traffic in a manner that attracts attention to them by, for example, displaying them in a large font compared to keywords with less traffic. A visual navigation website map may also group similar keywords in the same color or shape in the display. Such a visual display gives an overall view of the website interactively and can make them more understandable. In certain embodiments, keyword navigation serve 120 may also crawl the web pages hosted at a domain name to gather information for other words appearing frequently in the website. In such an embodiment, these frequently appearing words may appear in the visual navigation map with keywords. In some embodiments the keywords may appear in a different shape than non-keywords.

In Step 245, keyword navigation server 120 may present data to a domain name controller that enables the domain name controller to establish a predetermined hostname on the domain that redirects requests to keyword navigation server 120. The hostname may be, for example, "goto." Keyword navigation server 120 may instruct the domain name controller to add an address record in the domain name controller's DNS that would instruct a browser to send the request to keyword navigation server 120. For example, if Acme Corporation owns the domain name "acmecorp.cc," keyword navigation server 120 may instruct an Acme Corporation representative to add an address record in the acmecorp.cc DNS that indicates requests for "goto.acmecorp.cc" should be directed to the numerical (IP) address of keyword navigation server 120, for example, 72.55.55.55.

Figure 10:
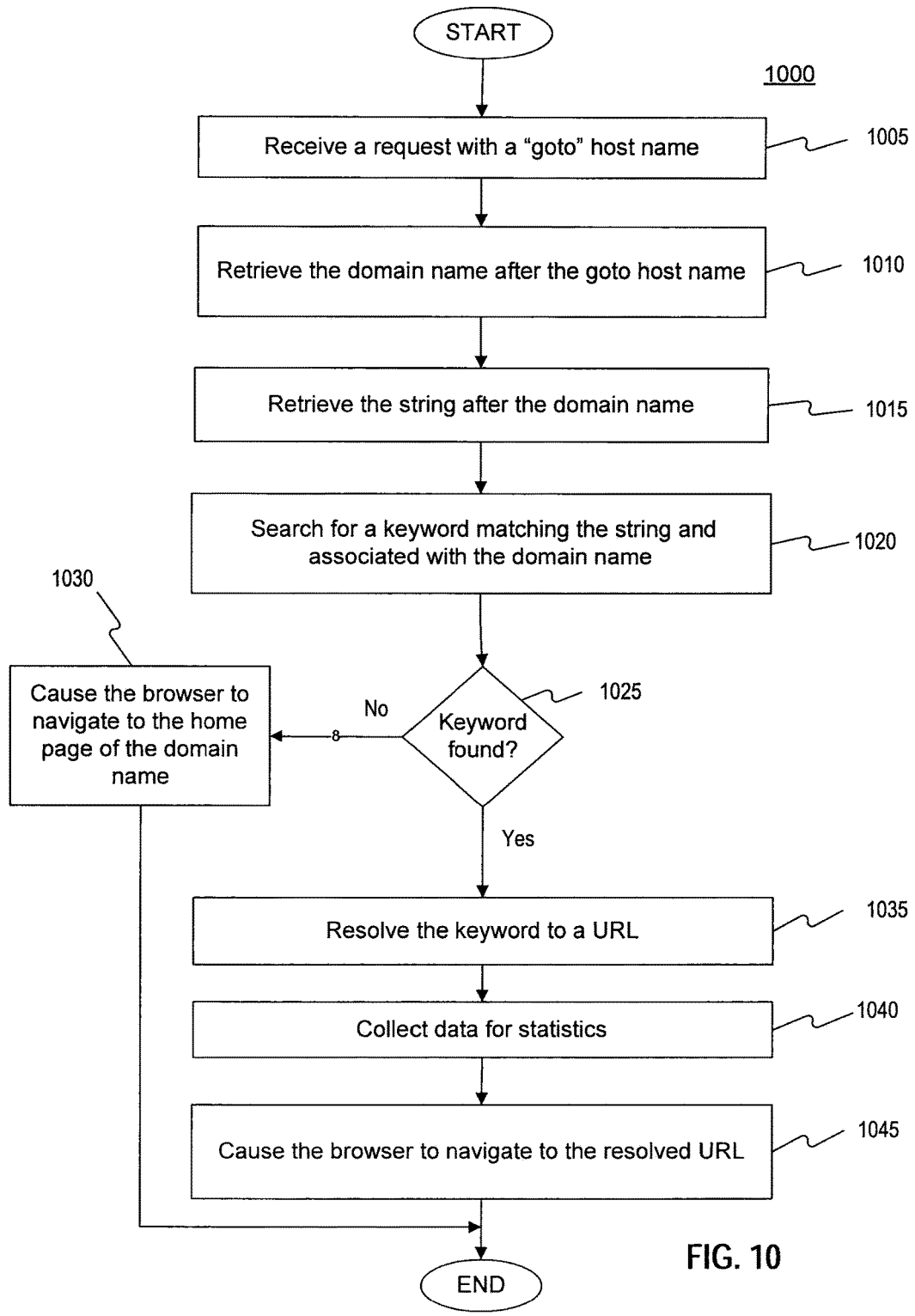
FIG. 10 is a flow diagram illustrating an exemplary process for using keywords to navigate to a web page using hostname resolution, consistent with disclosed embodiments.

FIG. 10 is a flow diagram illustrating an exemplary process 1000 for using keywords to navigate to a web page from requests directed to a "goto" hostname. Keyword navigation server 120 may perform process 1000 after receiving a request directed to, for example, "goto.acmecorp.cc/Acme's fairy tales." In Step 1005, keyword navigation server 120 receives the request with a "goto" hostname. As described above, such requests may be received from websites, such as a website hosted at web server 140, that have added a record to the DNS that sends the request to the IP address of keyword navigation server 120, as described above. In Step 1010, keyword navigation server 120 may parse the request to locate and retrieve the domain name. The request may be in the format of "goto.<domainname>/<string>." Keyword navigation server 120 may retrieve the characters following the period "." after "goto" and before the slash "/" as the domain name. For example, if the request has the format "goto.acmecorp.cc/Acme's fairy tales," then keyword navigation server 120 may retrieve "acmecorp.cc" as the domain name.

In Step 1015, keyword navigation server 120 retrieves the string following the domain name and the slash "/" at the end of the request. Keyword navigation server 120 may treat any characters following the slash "/" as the string, including spaces, punctuation marks, and non-English characters. Although the request may have the appearance of an Internet address, the characters following the slash "/" may be any UTF-8 characters and do not necessarily represent a valid Internet address. In the present example, keyword navigation server 120 may retrieve "Acme's fairy tales" as the keyword. Next, in Step 1020, keyword navigation server 120 searches using, for example, a keyword database such as tables 505 and 510, for a domain name matching the retrieved domain name and a keyword matching the retrieved string. If no match is found (Step 1025, No), then in Step 1030 keyword navigation server 120 may cause the browser to navigate to the home page of the domain name. In other embodiments, keyword navigation server 120 may cause the browser to navigate to a public search of the keyword database, as described below with regard to FIGS. 11-13.

If a matching keyword is found for the domain name (Step 1025, Yes), then in Step 1035 keyword navigation server 120 may resolve the keyword to a URL. In disclosed embodiments this may involve looking for the URL associated with the keyword such as, for example, a URL stored in Table 515. In certain embodiments, keyword navigation server 120 may also check flag 517 to verify whether the URL is still valid. If the URL is not valid, keyword navigation server 120 may determine that a resolution cannot be made and transfer control to Step 1030, described above. In other embodiments, resolving the URL may involve determining the location associated with the original request and using the location to pick one of several URLs associated with the keyword. In yet other embodiments, this may involve determining a device type associated with the request and using the device type to pick one of sever URLs associated with the keyword.

In Step 1040, keyword navigation server 120 may collect data for statistics about the keyword. For example, keyword navigation server may update a counter of the number of times the keyword for the domain has been resolved to a URL. The data may also reflect that the keyword was retrieved as part of a "goto" process rather than a public search or a search initiated from an upgraded site search box on a website at the domain. In other embodiments, the data may also reflect the date, location, or device type of the request, or a combination of these. Finally, in Step 1045, keyword navigation server 120 may cause the browser to navigate to the resolved URL.

Figure 11:
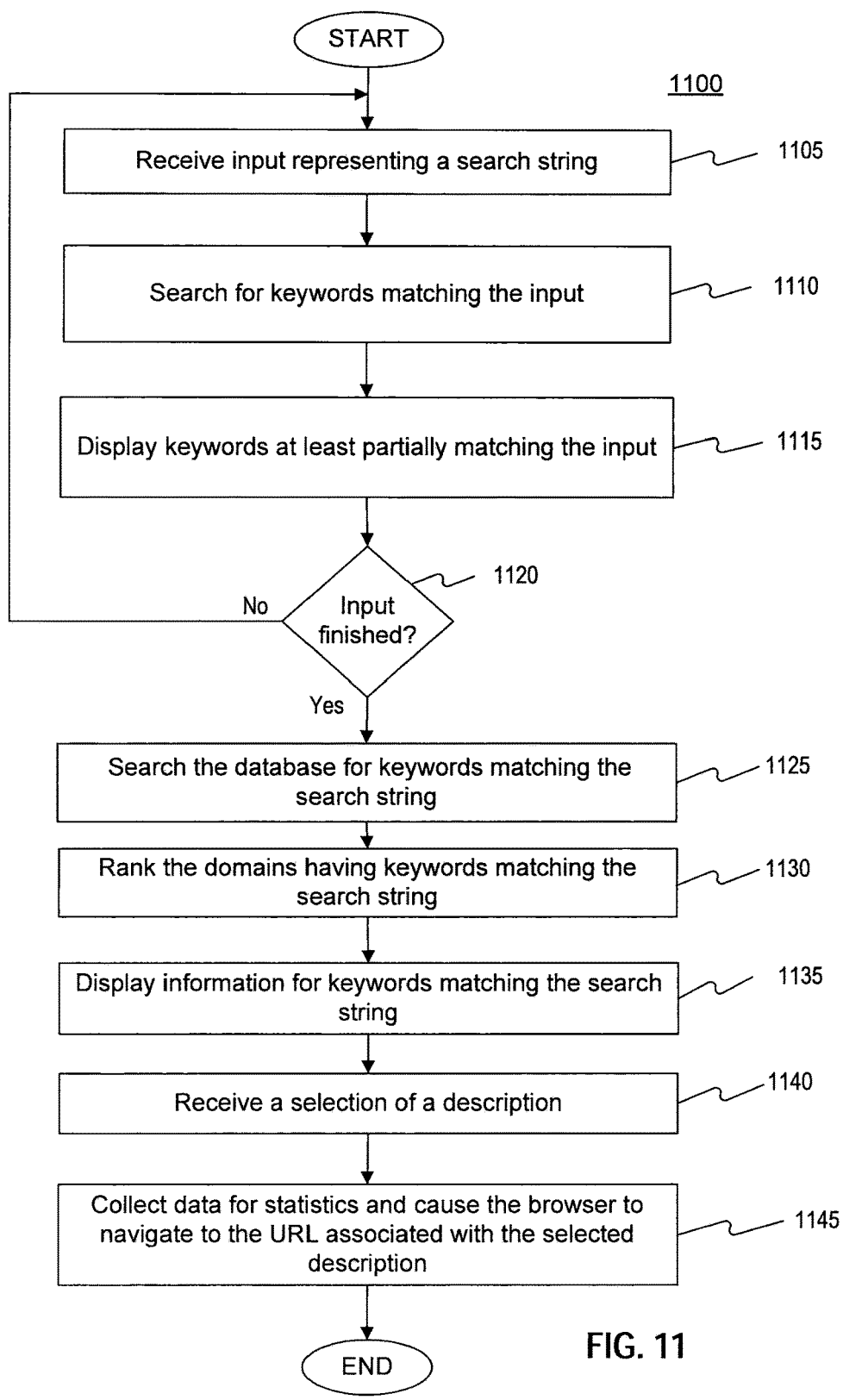
FIG. 11 is a flow diagram illustrating an exemplary process to perform a public search of a database of domain specific keywords, consistent with disclosed embodiments.
Figure 12:
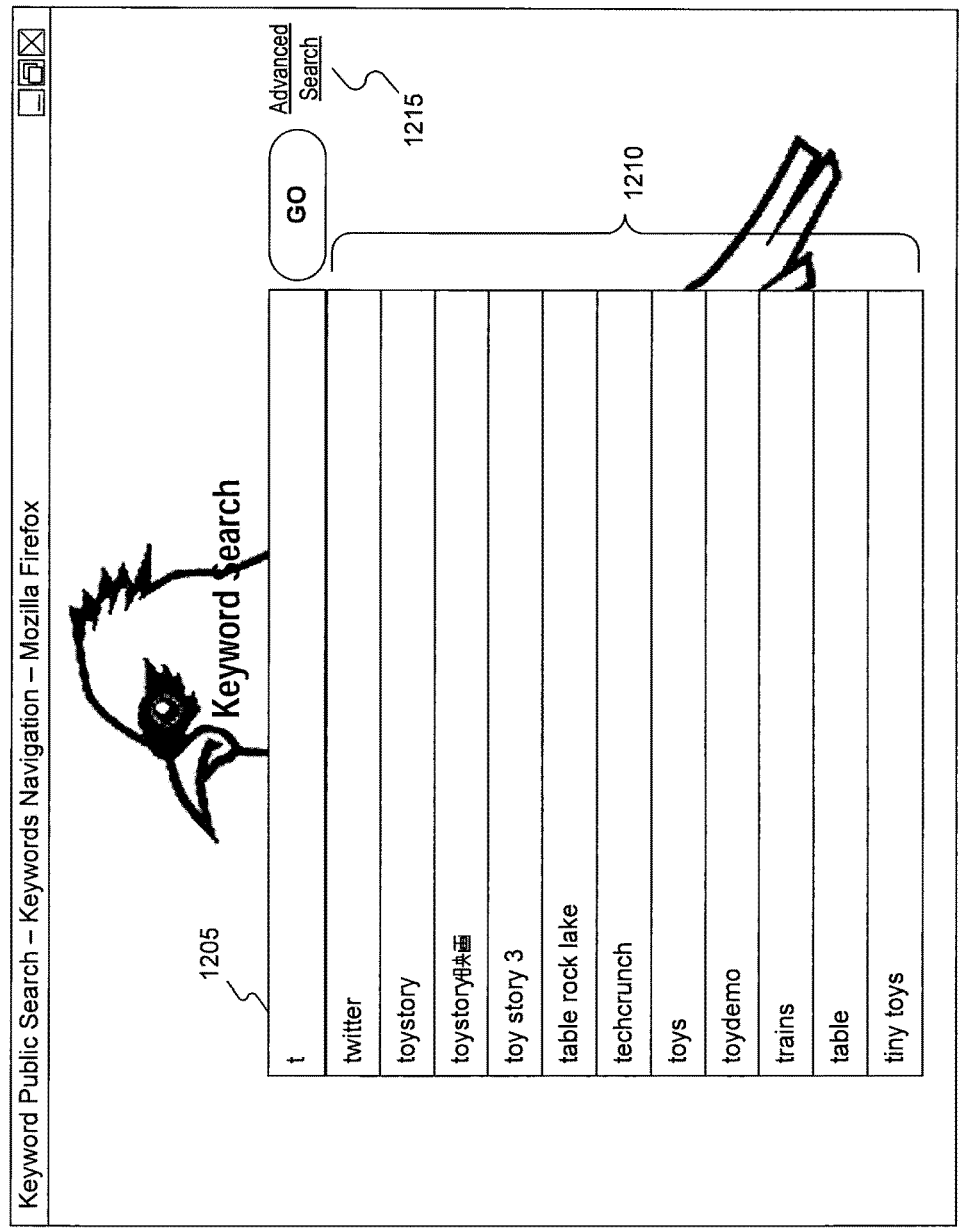
FIG. 12 is an exemplary interface for performing a public search of a database of domain specific keywords, consistent with disclosed embodiments.

FIG. 11 is a flow diagram illustrating an exemplary process 1100 for performing a public search of a database of domain specific keywords, consistent with disclosed embodiments. A public search may be a search of domain specific keywords from an interface provided by keyword navigation server 120, rather than a search done through an upgraded search box at another domain. Keyword navigation server 120 may use process 1100 to search all keywords regardless of domain name from such an interface. FIG. 12 is an exemplary interface for such a public search.

In Step 1105, keyword navigation server 120 may receive input representing a search string from a user. In some embodiments, the input may be received in a text box such as text box 1205 of FIG. 12. At Step 1110, keyword navigation server 120 may search a keyword database for keywords that match the input. For example, keyword navigation server 120 may search table 510 for keywords that match the input that the user has typed so far. At Step 1115, keyword navigation server 120 may display keywords that match at least the input received from the user. In the example of FIG. 12, the user has typed the character "t" into search box 1205. As a result, keyword navigation server 120 may return all keywords in table 510 that begin with a "t," such as list 1210 in FIG. 12. Keyword navigation server 120 may return all keywords that start with a "t," regardless of the domain name the keywords are associated with.

Next, at Step 1120, keyword navigation server 120 may determine whether the user is finished. Keyword navigation server 120 may determine that the user is finished when keyword navigation server 120 receives an indication that the user has selected one of the keywords in list 1210. A user may select a keyword in list 1210, for example, by moving a cursor over the keyword and clicking with a mouse or highlighting the keyword and pressing the "Enter" key. Keyword navigation server 120 may also determine that the user is finished when it receives an indication that the user has selected on the "Go" button. If the user is not finished (Step 1120, No), then keyword navigation server may proceed to receive additional input at step 1105.

If the user is finished with input (Step 1120, Yes), then at Step 1125 keyword navigation server 120 may search a database of keywords, such as table 510, for keywords matching the search string entered by the user. As described above, keyword navigation server 120 may search all keywords, regardless of domain name.

Once keywords are found, in Step 1130, keyword navigation server 120 may rank the information for keywords matching the search string. To rank the keywords, for example, keyword navigation server 120 may determine the domain names represented by the matching keywords. In some embodiments, keyword navigation server 120 may order the domain names by the traffic score of each domain name. A traffic score is a figure that determines the number of DSN resolutions made for a domain name in a given time frame. DNS resolutions are made by browsers and other clients when website visitors open a website or select a URL from a website. Such resolutions may be tracked by companies managing different domains. In other embodiments, keyword navigation server may order the domain names by ranking domain names with high-traffic keywords first in a list. The keyword traffic statistics may be determined from the statistics gathered, for example, during Step 710 of process 700 and may be summarized by domain name. In yet other embodiments, the traffic statistics may be determined from statistics gathered in process 1100. The keyword rank may also be based on other statistics or metadata available about the keywords. In some embodiments keywords are not grouped by domain name but are ranked individually using the traffic statistics or other statistics and metadata.

Figure 13:
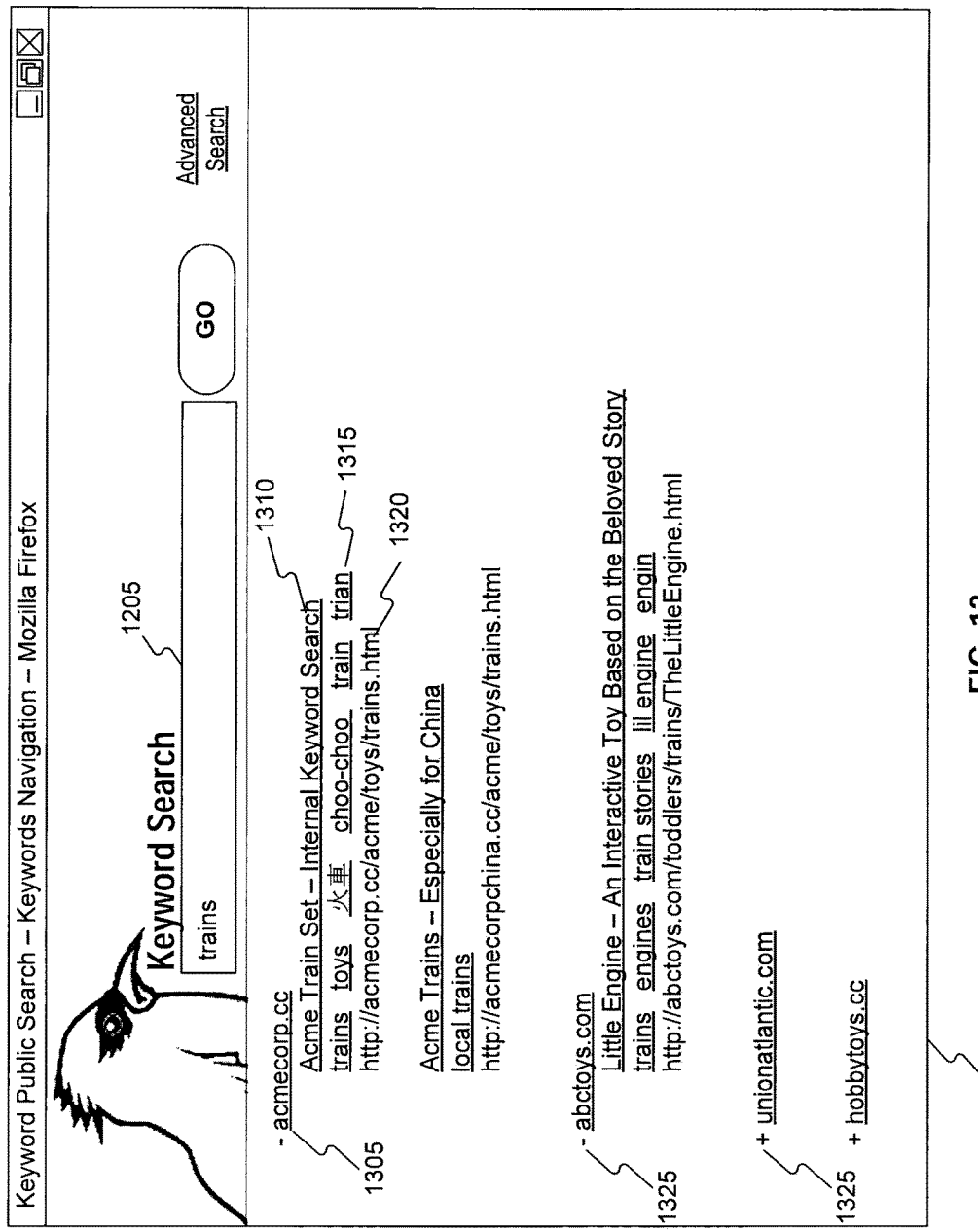
FIG. 13 is an exemplary interface for displaying the results of a public search of a database of domain specific keywords, consistent with disclosed embodiments.

In Step 1135, keyword navigation server 120 may cause the display of information for keywords matching the search string. FIG. 13 is an exemplary interface 1300 for displaying the keyword information for keywords matching the search string. As shown in FIG. 13, keyword navigation server 120 may display the domain name 1305. Domain name 1305 may be a domain that is associated with a keyword matching the search string. Under each domain name, keyword navigation server 120 may display a description of the URL that the matching keyword resolves to, such as description 1310. Description 1310 may be a hyperlink that, when clicked, causes the browser to navigate to the URL.

For each description, keyword navigation server 120 may also display a list of keywords 1315 that resolve to the same URL. Keyword navigation server 120 may list keywords that match the search term of box 1205 as well as any other keywords within the domain that resolve to the same URL, as shown in FIG. 13. The keywords in list 1315 may also be hyperlinks that, when selected, cause keyword navigation server to treat the selected keyword as a search string. For example, if a user selects the "choo-choo" keyword link of FIG. 13, keyword navigation server 120 may start process 1100 at Step 1125 using "choo-choo" as the search string. As part of display 1300, keyword navigation server 120 may also list the URL the keywords resolve to, such as URL 1320.

Keyword navigation server 120 may display domain names that are associated with keywords matching the search string. To conserve screen space, keyword navigation server 120 may provide a method to expand or collapse the URL and keyword information within domain name, such as icon 1325. When expanded, keyword navigation server 120 may display the keyword and URL information, as shown under "acmecorp.cc." When collapsed, keyword navigation server 120 may only display the domain name, as shown for "unionatlantic.org." As described above, the domain names may be ordered such that the domain name associated with the keyword having the highest traffic statistics may be listed first.

In Step 1140, keyword navigation server 120 may receive a selection of a description 1310. In Step 1145, keyword navigation server 120 may collect additional data for statistics. For example, keyword navigation server 120 may update a counter that tracks the number of times the URL was selected from the public search screen. In other embodiments, keyword navigation server 120 may store the date of the search, the location of the user, or both for the selected URL. Once statistical information has been collected, keyword navigation server 120 causes the browser to navigate to the URL associated with the selected description.

In some embodiments, process 1100 may include advanced search options. Advanced search options may be available through, for example, selecting link 1215 of FIG. 12. Advanced search options may allow a user to narrow a search to specified domain names. In alternative embodiments, a user may enter a domain name and select the "Go" button without entering any input for the search string. In response, keyword navigation server 120 may display all keywords associated with the domain name. Advanced search options may also allow a user to search domain specific keywords by device type, location, URL description, or any combination of these.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage devices, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A system, comprising:
 a processor; and
 a memory coupled to the processor, the memory storing instructions to direct the processor to perform operations comprising:
  determining that a domain name controller is authorized for keyword navigation;
  receiving, via keyword registration user interface, from the domain name controller of a plurality of webpages of a web site hosted by a web server, a keyword and information identifying a webpage of the plurality of webpages;
  storing, in a database, the keyword in association with the information identifying the webpage;
  receiving a search string from the web server, wherein the search string is entered via a search user interface at the website by a website visitor;
  locating in the database the keyword associated with the website and matching the search string based on authorization of the domain name controller for keyword navigation;
  determining a domain name of the webpage associated with the matching keyword, the matching keyword being generated by a domain name controller that has been authenticated as being authorized by a registrant of the domain name to set up the matching keyword for the domain name;
  determining a web page address of one of the plurality of web pages hosted at the website associated with the matching keyword,
  retrieving a description for the web page address associated with the matching keyword, and
  generating data used to display the domain name, the web page address, the description, and the matching keyword to the user, wherein the description is displayed as a hyperlink that causes a browser to be directed to the determined web page address of the one of the plurality of web pages hosted at the website.

2. The system of claim 1, the operations further comprising:
 receiving a selection of the hyperlink;
 collecting and storing statistical data about the selection of the web page address; and
 causing the browser to be directed to the web page associated with the web page address.

3. The system of claim 1, the operations further comprising:
 retrieving a plurality of keywords associated with the web page address; and
 generating data used to display the domain name, the web page address, and the plurality of keywords.

4. The system of claim 1, the operations further comprising:
 receiving a domain name from the user,
 wherein the locating further comprises locating a keyword matching the search string and associated with the domain name received from the user.

5. The system of claim 1, the instructions further comprising:
 authenticating whether the domain name controller is authorized to set up the matching keyword for the domain name.

6. The system of claim 5, wherein authenticating the domain name controller comprises:
 querying a web page of the domain name to determine if the web page includes a first meta tag;

if the web page does not include the first meta tag, determining that the domain name controller is not authorized to set up the matching keyword for the domain name;

if the web page does include the first meta tag:
 determining whether the first meta tag matches a stored value;
 if the first meta tag matches the stored value, determining that the domain name controller is authorized to set up the matching keyword for the domain name; and
 if the first meta tag does not match the stored value, determining that the domain name controller is not authorized to set up the matching keyword for the domain name.

7. The system of claim 5, wherein authenticating the domain name controller comprises:
 querying a DNS of the domain name to locate a CNAME Host;
 if the DNS does not include the CNAME Host, determining that the domain name controller is not authorized to set up the matching keyword for the domain name; and
 if the DNS does include the CNAME Host,
  determining whether the CNAME Host matches a stored value;
  if the CNAME Host matches the stored value, determining that the domain name controller is authorized to set up the matching keyword for the domain name; and
  if the CNAME Host does not match the stored value, determining that the domain name controller is not authorized to set up the matching keyword for the domain name.

8. The system of claim 5, the instructions further comprising:
 storing a flag with the domain name if the domain name controller is authenticated as being authorized to set up the matching keyword for the domain name.

9. The system of claim 5, the instructions further comprising:
 storing a flag with the domain name if the domain name controller is authenticated as being authorized to set up the matching keyword for the domain name.

10. The system of claim 1, the operations further comprising:
 determining whether the keyword has expired, an expiration date of the keyword being set by the domain name controller,
 wherein the browser is directed to the web page associated with the web page address if the keyword has not expired, and
 wherein the browser is not directed to the web page associated with the web page address if the keyword has expired.

11. A computer-implemented method, comprising:
 determining that a domain name controller is authorized for keyword navigation;
 receiving, via keyword registration user interface, from the domain name controller of a plurality of webpages of a web site hosted by a web server, a keyword and information identifying a webpage of the plurality of webpages;
 storing, in a database, the keyword in association with the information identifying the webpage;
 receiving a search string from the web server, wherein the search string is entered via a search user interface at the website by a website visitor;
 locating in the database the keyword associated with the website and matching the search string based on authorization of the domain name controller for keyword navigation;
 determining a domain name of the webpage associated with the matching keyword, the matching keyword being generated by a domain name controller that has been authenticated as being authorized by a registrant of the domain name to set up the matching keyword for the domain name;
 determining a web page address of one of the plurality of web pages hosted at the website associated with the matching keyword,
 retrieving a description for the web page address associated with the matching keyword, and
 generating data used to display the domain name, the web page address, the description, and the matching keyword to the user, wherein the description is displayed as a hyperlink that causes a browser to be directed to the determined web page address of the one of the plurality of web pages hosted at the website.

12. A non-transitory computer-readable storage device storing instructions causing one or more computer processors to perform operations, comprising:
 determining that a domain name controller is authorized for keyword navigation;
 receiving, via keyword registration user interface, from the domain name controller of a plurality of webpages of a web site hosted by a web server, a keyword and information identifying a webpage of the plurality of webpages;
 storing, in a database, the keyword in association with the information identifying the webpage;
 receiving a search string from the web server, wherein the search string is entered via a search user interface at the website by a website visitor;
 locating in the database the keyword associated with the website and matching the search string based on authorization of the domain name controller for keyword navigation;
 determining a domain name of the webpage associated with the matching keyword, the matching keyword being generated by a domain name controller that has been authenticated as being authorized by a registrant of the domain name to set up the matching keyword for the domain name;
 determining a web page address of one of the plurality of web pages hosted at the website associated with the matching keyword,
 retrieving a description for the web page address associated with the matching keyword, and
 generating data used to display the domain name, the web page address, the description, and the matching keyword to the user, wherein the description is displayed as a hyperlink that causes a browser to be directed to the determined web page address of the one of the plurality of web pages hosted at the website.

* * * * *